9631X
S. RUSSELL
EXCAVATOR.
Patented Apr. 28, 1836.
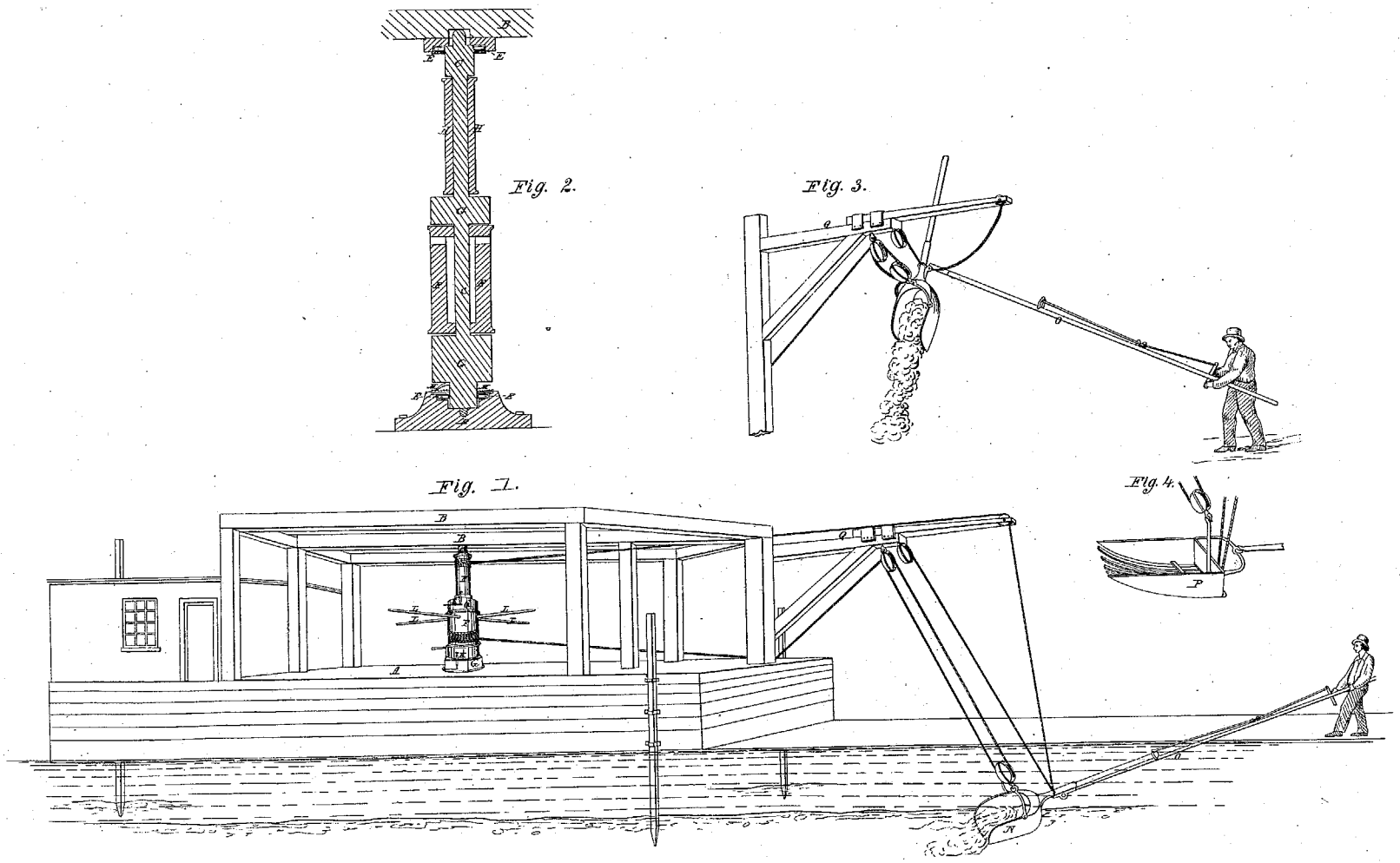

9631X

Apr 28-1836

1

Silvanus Russell of Buffalo New York
Letters Patent

The Schedule referred to in these Letters Patent and making part of the same containing a description in the words of the said Silvanus Russell himself of his improvement in the machine for Excavating and raising mud and Stones from the bottom of Rivers, Docks &c.

To all to whom these presents shall come. Be it known that I Silvanus Russell of Buffalo in the County of Erie and State of New York have invented a new and useful improvement in the manner of constructing and combining the several parts of a machine for excavating and raising mud. and Stones from the bottom of Rivers Docks, or Canals. and that the following is a full and exact description of the construction and operation thereof.

A platform is to be made of any desired size, having a framework above it in order to support the machinery as is usually done. Through the upper floor of it at about the centre. an opening is made to receive a shaft which is to stand vertically resting upon a step in the bottom floor, which step is also furnished with friction rollers set perpendicularly around the axis of the shaft. another similar set of rollers. receive the upper axis of the shaft supported by the frame work alone. This shaft has a square base just above the step sufficiently broad to support a cylindrical capstan which is to revolve freely on the shaft as its axis. and a projection at each end of this capstan prevents the rope (to be wound round it) from slipping off. Immediately above this is another base (though in this instance a round one) and placed in almost the centre of the length of the main shaft. and intended as a support to another cylindrical capstan of about one half of the diameter of the first or lower one. and will also revolve loosely and occupy the remaining distance between the top base or support and the top of the shaft. it is also provided in like manner with guards to retain the rope which is to be wound round it. As it is at times necessary to connect either or both of the cylinders with the main shaft so as to
revolve with it, or to set either or both in motion again at pleasure
around the shaft. I use the following means of effecting that pur-
pose. First at the lower part of the first described cylinder is
to be inserted a pin or catch in order to strike against a bar or
lever which hangs suspended in an upright position on one side
of the square base of the main shaft. by a pivot placed near the upper
end: so as that bar may when at liberty always fall into a perpen-
dicular line. and to ensure which another pin is placed in the
side of the base below. Here the bar falls into the jaws of a horizon-
tal lever resting or working on a pivot in the side of the base and
horizontally beneath the vertical one first mentioned. The opposite
end of the jaws is worked up or down by means of a connecting rod
which rises up the next adjoining side to a lever handle suppor-
ted and working by a pivot on an upright from said side so as
that the jaws may be loosened or secured to the end of the vertical
bar at pleasure. and thereby allow of a [illegible] backward mo-
tion of the cylinder when desired which the application of the jaws
will check when pressing on the lever handle upwards for that in-
tent and that it may be convenient the handle is placed just above
the upper floor. A similar contrivance is also attached to the
upper cylinder at its base. but dispensing with the connecting
rod and lever handle. as from its elevation the opposite end of
the jaw lever will answer that purpose. around the base are also
placed the levers or arms by which to drive the main shaft should
not steam be used. A rag wheel and catch are placed at the bot-
tom of the shaft. the wheel around the friction roller being placed
horizontally on the bed piece and the catch secured to the side
of the base so as to traverse with it and prevent a backward
motion of the shaft. From these cylinders ropes are rove through
blocks suspended from a crane placed vertically at one side of
the platform and frame as usual and connect with the scoop
which I discharge by the following construction thereof. It will be made of the usual shovel shape, sustained by a handle arop,
into which hooks the tackle intended to raise it. a long shank
is attached to the handle end, into which I insert a long handle
terminating in a smooth round end a ring also being fastened to
the shank near the scoop to which is hooked the tackle leading
from the upper cylinder. Immediately beneath this ring is placed
on the under side of the shank. a hinge joint into which is insert
ed the end of a long handle of double the length of the first one.
or to any desired length. and is intended to contain the appara-
tus for unloading the scoop. For this purpose it is furnished close
to the end of the first described handle with a fork or rest into
which said handle drops and immediately beneath this end there
of. a clasp which works on a pivot in the lower handle shuts on
the said end of the first handle and holds it fast. and of course
makes a stiff handle throughout for operating the scoop in the
mud. and raising it. but the moment the clasp is withdrawn
the charge of mud in the scoop being heavier than the short han-
dle, bears down the mouth thereof which discharges and at the same
time ~~that~~ the short handle tilts by its hinge upon the long one. until
the shovel being free the handle end preponderates and it falls in
to the fork when the clasp is forced over it and the whole becomes
stiff again. This clasp is operated by means of a connecting rod which
leads to an upright lever passing through the end of the long handle
where it plays upon a pivot and is operated on at pleasure by the hand
so as either to clasp or unclasp the short handle of the scoop when
desired. When there are stones to be removed previous to the applica-
tion of the scoop, I employ a Rake of the following construction: The
back and sides will be of sheet Iron or other suitable material but the
bottom will be formed of rods or teeth of sufficient strength set into
a bar at the back, also strengthened by one or more at a short distance
in front thereof. from which point the teeth will rise or be bent up
wards so as to form an angular bending, upon the line of which the
rake will operate. On the inside of the back is placed a short handle or pole having a hook at the end to hook into the tackle from the lower cylinder, and on the opposite side of the back is placed a bar, having an eye placed just below the back of the rake into which is hooked the tackle from the small cylinder, by the rising of which the bottom of the Rake is elevated and discharged consequently of the contents gathered by the application of power in dragging by the lower cylinder and pole. From one side to the other and behind is placed a semicircular handle or rod, to the centre of which is hooked on a long wooden pole or handle by which the rake is to be withdrawn a sufficient distance to be operated on by the lower cylinder and it also serves to guide it on the course of said operation. It will be apparent that the two cylinders and shaft will be connected and secured as one by means of the key contrivance already mentioned, and will consequently heave round all together as the arms are moved on, but the moment that the elevation is effected, or a separate movement of either of the cylinders is required, then the proper application to either horizontal jaw will effect the desired effect. It is also evident that other modifications may be made to avail on the same principle but I consider these already set forth to be the best I have yet used and have therefore preferred them.

What I claim as my invention is not the several parts of the above shaft and cylinders, but their combination and adaptation to the purposes of operating the scoop or Rake, by means of the crane and tackles as above described. I likewise claim the manner of constructing the handles and apparatus attached thereto for operating, and discharging the scoop as set forth, also the construction of the Rake and its mode of operating and discharging as stated above. In testimony whereof I have hereunto set my hand.

Witnesses
Henry Stone
Jno. Hettinas

Salvanus Russell